United States Patent [19]

Schaible

[11] Patent Number: 4,997,201
[45] Date of Patent: Mar. 5, 1991

[54] WHEEL SUSPENSION

[75] Inventor: Walter Schaible, Hemmingen, Fed. Rep. of Germany

[73] Assignee: Dr. Ing. h.c.F. Porsche AG, Fed. Rep. of Germany

[21] Appl. No.: 418,624

[22] Filed: Oct. 10, 1989

[30] Foreign Application Priority Data

Oct. 15, 1988 [DE] Fed. Rep. of Germany ....... 3835225

[51] Int. Cl.$^5$ ...................... B60G 15/07; B60G 15/14
[52] U.S. Cl. ..................................... 280/668; 267/34; 267/251; 267/64.24; 280/692; 280/697; 280/698
[58] Field of Search ............... 280/670, 690, 691, 692, 280/666, 667, 693, 696, 697, 698, 668, 701; 267/248, 251, 252, 254, 34, 64.24

[56] References Cited

FOREIGN PATENT DOCUMENTS

| | | | |
|---|---|---|---|
| 0203704 | 12/1986 | European Pat. Off. | ............... 267/34 |
| 2633402 | 1/1978 | Fed. Rep. of Germany . | |
| 3046327 | 7/1982 | Fed. Rep. of Germany . | |
| 3405174 | 9/1983 | Fed. Rep. of Germany . | |
| 3316957 | 6/1984 | Fed. Rep. of Germany | ........ 267/34 |
| 3625284 | 11/1987 | Fed. Rep. of Germany . | |
| 2125450 | 6/1975 | France . | |
| 2137146 | 10/1984 | United Kingdom . | |

OTHER PUBLICATIONS

J. Reimpell: "Chassis Technology: Wheel Suspensions", 1986, p. 254, Vogel–Buchuerlag, Wurzburg, De.

Primary Examiner—Charles A. Marmor
Assistant Examiner—Karin Tyson
Attorney, Agent, or Firm—Evenson, Wands, Edwards, Lenahan & McKeown

[57] ABSTRACT

A wheel suspension for motor vehicles has a wheel guiding member and a spring strut, the spring element of which has at least two spring parts which are spaced away from one another in a direction of a spring axis. These spring parts form a clearance between one another and are connected with one another by an intermediate element. The spring parts are respectively arranged above and below a ring section of the tire. By means of an intermediate element which is directly adjacent to the section and extends approximately in vertical direction, they are, arranged in series, connected with one another.

9 Claims, 2 Drawing Sheets

WHEEL SUSPENSION

BACKGROUND AND SUMMARY OF THE INVENTION

The present invention relates to a wheel suspension and more particularly a wheel suspension having a shock absorber strut and a spring element which, while the piston jamming force is reduced, only requires a relatively small installation space between the wheels of an axle and permits a low construction profile.

From the technical book "Fahrwerktechnik: Radaufhängungen" ("Chassis Technology: Wheel Suspensions") (Reimpell, J., Würzburg, 1st Edition 1986, Page 254, FIG. 6.2/3), a wheel suspension is disclosed which has a spring strut and a one piece coil spring which is arranged diagonally with respect to the axis of the shock absorber strut, whereby an at least partial compensation of a normal wheel force is achieved, and a reduction or elimination of piston jamming forces can be achieved.

In the case of an arrangement above the wheel, the one piece coil springs result in a large overall height of the spring strut, or in the case of an arrangement next to the wheel, they result in a relatively large steering force lever arm, which has a negative effect on the directional stability characteristics of the vehicle.

A division of the spring element into two pieces and the supporting of these series connected spring elements by means of an intermediate element is disclosed by German Published, Unexamined Patent Application (DE-OS) 34 05 174. In this construction an upper spring element is arranged at the level of the section of the tire, and the intermediate element connecting the two spring elements is used for the unimpaired guiding through of a drive shaft to the wheel. In this construction, the spring elements are arranged next to the shock absorber strut so that the installation space between the wheels is reduced significantly.

Thus, it is an object of the present invention to provide a wheel suspension having a shock absorber strut and a spring element which, while the piston jamming force is reduced, requires only a relatively small installation space between the wheels of an axle and permits a low construction.

Principal advantages achieved by preferred embodiments of the invention are that, by means of a two part spring and its arrangement close to a wheel or partially in the rim nave of a wheel, an enlarged installation space is created between the wheels of an axle, and a low overall height is provided. For this purpose, the springs, operating in series, are connected with one another by an intermediate element which is arranged in the area of a ring section of the tire. In order to guide the intermediate element close to the wheel, the wheel may have a corresponding recess.

The displacing of a spring axis of the lower spring element with respect to a spring axis of the upper spring element toward the wheel causes a force which counteracts the transverse force which is always present at the body side fastening point during straight ahead driving. This force, as a function of the loading condition, may result in a neutralizing of the transverse force. This compensating effect is reinforced by the displacement of the lower suspension joint toward the outside into the wheel, because the lever arm of the vertical force affecting the wheel is shortened and thus, on the whole, smaller bearing forces are created.

Other objects, advantages and novel features of the present invention will become apparent from the following detailed description of the invention when considered in conjunction with the accompanying drawings.

DETAILED DESCRIPTION OF THE DRAWINGS

Figures 1, 2:
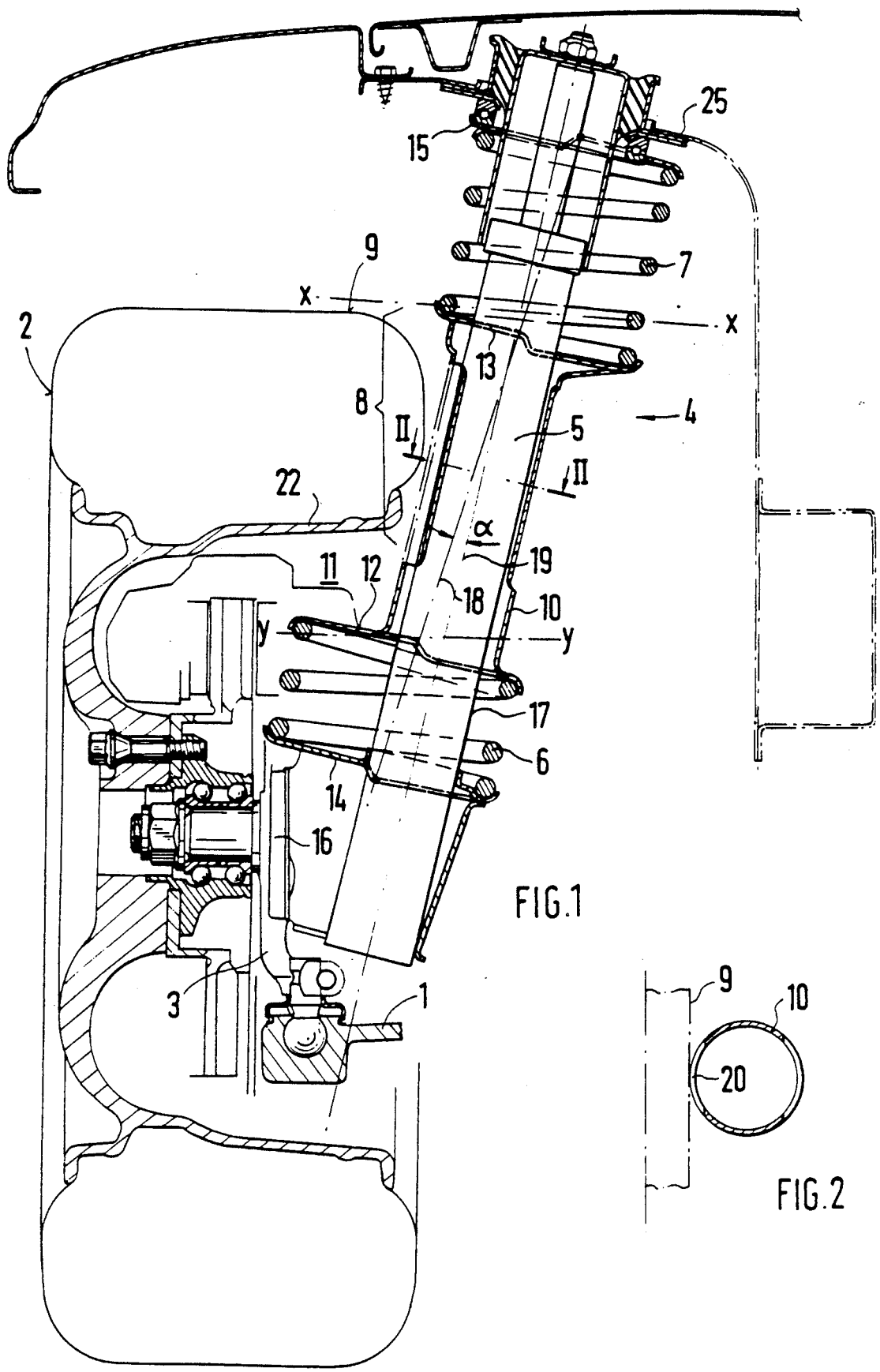
FIG. 1 is a front view of a wheel suspension having two spring parts on a shock absorber strut which are held by a connecting element according to one embodiment of the present invention.
FIG. 2 is a sectional view of the connecting element according to Line II—II of FIG. 1.

An embodiment of the invention is shown in the drawings and will be described in detail in the following.

The wheel suspension of a vehicle comprises essentially a wheel guiding member 1 and a spring strut 4 connected with a wheel 2 at a wheel carrier 3, this spring strut 4 being supported on a top side at a vehicle body 25.

The spring strut 4 includes a shock absorber strut 5 and a coil spring having two spring parts 6 and 7. These spring parts 6 and 7 are respectively arranged above and below a ring section 8 of a tire 9 and, in series, are connected with one another by a sleeve-shaped intermediate element 10.

The intermediate element 10 extends in a substantially vertical direction along the ring section 8 of the tire and is guided close to the wheel 2 with the shortest possible lateral spacing, as shown in detail in FIG. 1.

In the construction according to FIG. 1, the spring parts 6 and 7 are, for example, arranged to be offset with respect to one another in the vertical direction in such a manner that the lower spring part 6 projects partially into a clearance 11 of a wheel rim 22. The upper spring part 7, is offset with respect to the longitudinal center axis of the vehicle. For supporting the spring parts 6 and 7, the intermediate element 10, at both of its ends, has spring plates 12 and 13 which are each offset correspondingly and are arranged at the plane Y—Y and X—X and which are opposed by the spring plates 14 and 15 at the wheel carrier 16 or at the shock absorber tube 17. The intermediate element 10 extends between planes X—X and Y—Y.

According to the construction of FIG. 1, the spring parts 6, 7, as a result of their offset arrangement with respect to one another, form a spring axis 18 which may be placed at an angle α with respect to the shock absorber strut axis 19.

According to a construction which is not shown, the spring parts 6, 7 may also be arranged coaxially with respect to the shock absorber strut 5. An arrangement is also possible in which the spring parts 6, 7 are jointly offset toward one side either in the direction of the wheel or in the direction of the center longitudinal axis of the vehicle, and a spring axis is obtained which is placed in parallel to the shock absorber strut axis.

So that the sleeve-shaped intermediate element 10 takes up a position which, if possible, is close to the wheels, it has a recess 20 in the area of the ring section 8 of the tire which extends in axial and in transverse direction.

In the shown construction, the sleeve-shaped connecting element 10 is arranged coaxially with play on the shock absorber tube 17, and the spring plates 12 and 13 connected with the element 10 are held at a distance from the tire.

Figure 3:
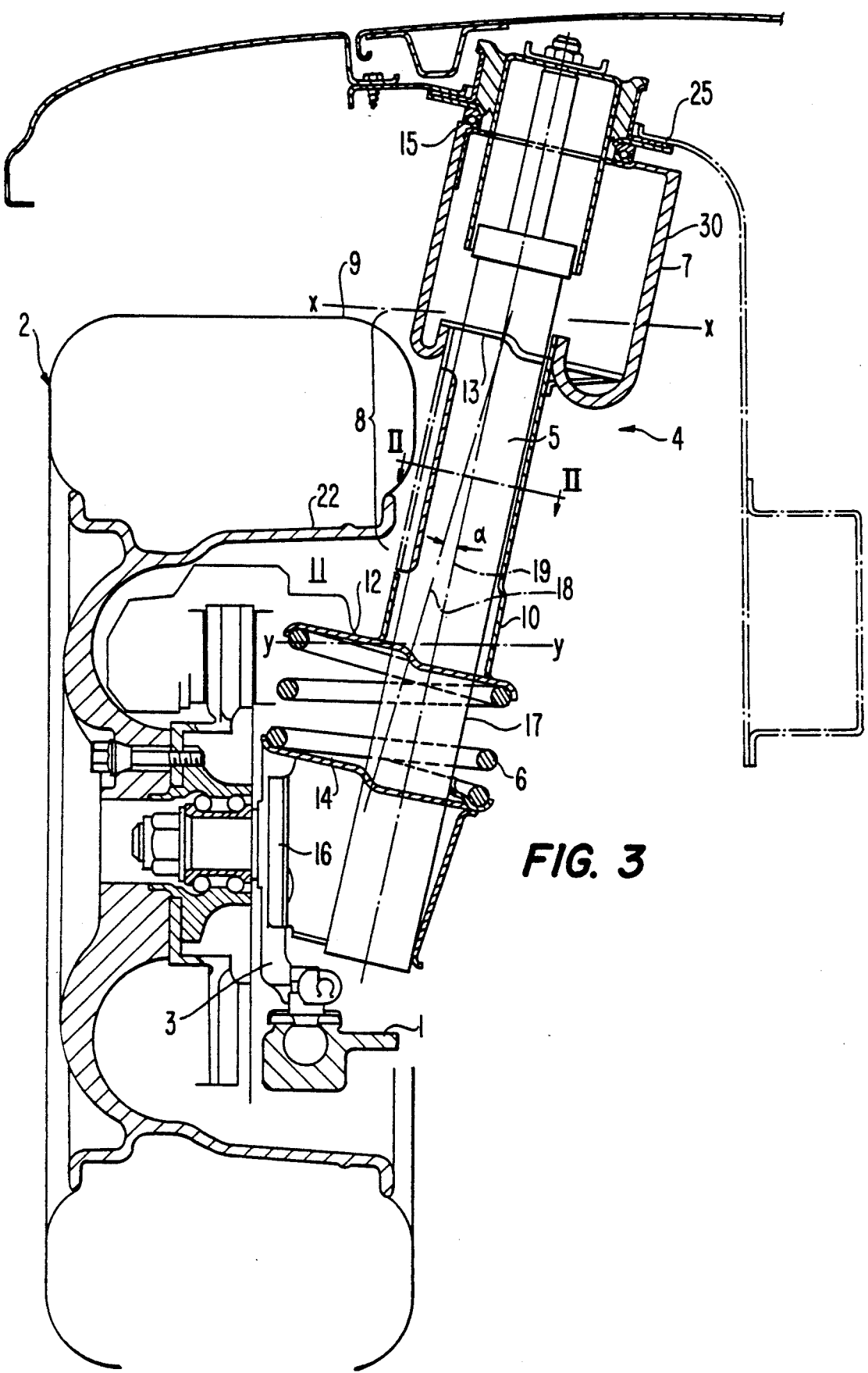
FIG. 3 is a front view of a wheel suspension having a combined spring strut including an upper force regulating part and a lower spring part.

When a combined spring strut is used, as shown in FIG. 3 the upper spring part 7 of FIG. 1 may be replaced by a characteristic-regulating and force-regulating spring element 30 such as an air spring or a hydraulically operating spring strut.

Although the present invention has been described and illustrated in detail, it is to be clearly understood that the same is by way of illustration and example only, and is not to be taken by way of limitation. The spirit and scope of the present invention are to be limited only bY the terms of the appended claims.

What is claimed:

1. A wheel suspension for a motor vehicle having a wheel guiding member and a spring strut, a spring element of which has at least two spring parts which are spaced from one another in a direction of a spring axis, form a clearance between one another, and are connected with one another by an intermediate element, wherein the at least two spring parts are respectively arranged above and below a ring section of a tire and are connected with one another, arranged in series, by the intermediate element which is directly adjacent to the ring section and extends approximately in a vertical direction, said intermediate element including sleeve-shaped part with at least one recess on a side facing the ring section of the tire.

2. A wheel suspension according to claim 1, wherein an upper spring part of the at least two spring parts with respect to the lower spring part of the at least two spring parts is held on the intermediate element in an offset manner with respect to a transverse direction of the vehicle such that the lower spring part is partially arranged in a clearance of a wheel rim of a vehicle wheel.

3. A wheel suspension according to claim 1, wherein an intermediate element, at ends thereof, has offset spring plates which are opposed by correspondingly arranged spring plates at a wheel carrier of the wheel and at a shock absorber tube and at a vehicle body, between which the at least two spring parts are arranged forming a spring axis which is placed at an angle with respect to a shock absorber strut axis.

4. A wheel suspension according to claim 1, wherein the sleeve-shaped intermediate element is arranged coaxially on a shock absorber tube, and connected spring plates are each spaced away from the ring section of the tire.

5. A wheel suspension according to claim 1, wherein a lower spring element of the at least two spring parts is constructed as a coil spring, and an upper spring element of the at least two spring parts is constructed as an air spring, and both springs are connected with one another by the sleeve-shaped intermediate element.

6. A wheel suspension for a motor vehicle having a wheel guiding member and a spring strut, a spring element of which has at least two spring parts which are spaced from one another in a direction of a spring axis, for a clearance between one another, and are connected with one another by an intermediate element, wherein the at least two spring parts are respectively arranged above and below a ring section of a tire and are connected with one another, arranged in series, by the intermediate element which is directly adjacent to the ring section and extends approximately in a vertical direction; and wherein an upper spring part of the at least two spring parts with respect to the lower spring part of the at least two spring parts is held on the intermediate element in an offset manner with respect to a transverse direction of the vehicle such that the lower spring part is partially arranged in a clearance of a wheel rim of a vehicle wheel, said intermediate element including a sleeve-shaped part with at least one recess on a side facing the ring section of the tire.

7. A wheel suspension according to claim 6, wherein an intermediate element, at ends thereof, has offset spring plates which are opposed by correspondingly arranged spring plates at a wheel carrier of the wheel and at a shock absorber tube and at a vehicle body, between which the at least two spring parts are arranged forming a spring.

8. A wheel suspension according to claim 6, wherein the sleeve-shaped intermediate element is arranged coaxially on a shock absorber tube, and connected spring plates are each spaced away from the ring section of the tire.

9. A wheel suspension according to claim 6, wherein a lower spring element of the at least two spring parts is constructed as a coil spring, and an upper spring element of the at least two spring parts is constructed as an air spring, and both springs are connected with one another by the sleeve-shaped intermediate element.

* * * * *